Oct. 8, 1940.                H. FOCKE                2,217,107
                ROTOR DEVICE FOR ROTATING-WING AIRCRAFT
                        Filed Feb. 18, 1938

Inventor
Henrich Focke
By Watson, Cole, Grosser & Grindle
Attorneys.

Patented Oct. 8, 1940

2,217,107

UNITED STATES PATENT OFFICE 2,217,107

ROTOR DEVICE FOR ROTATING-WING AIRCRAFT

Henrich Focke, Bremen, Germany

Application February 18, 1938, Serial No. 191,329
In Germany August 16, 1937

2 Claims. (Cl. 244—17)

This invention concerns improvements relating to rotor devices for rotating-wing aircraft, of the kind in which the rotor comprises a plurality of blades each connected to the hub by a so-called flapping joint and a so-called drag joint.

Stops for limiting the flapping movement of each blade have hitherto generally been so arranged that, with the blade resting upon the lower stop, drag movement of the blade was possible when the rotor was stationary. Since, in relation to the hub, the drag joint (with a vertical axis of rotation) was arranged beyond or outside the flapping joint (with a horizontal axis of rotation), the stop-means for the flapping movement had to act upon parts lying inside the drag joint. Heretofore this has involved no difficulty, since the drag movement was controlled by frictional damping. This frictional damping, however, is a source of many inconveniences due more particularly, to non-uniformity of the damping moment and to the endangering of the blade root by the alternating bending moment set up by this damping. It is, therefore, desirable to eliminate the latter. If this is done, however, the drag joint can turn easily and if starting of the rotor is effected somewhat carelessly, this ease of turning may result in the blade striking back hard in the drag movement, since the hub first experiences the rotation and the blades cannot follow immediately. Damage to the stops for the drag movement thus results.

According to the present invention, in a rotor device for aircraft of the kind set forth, a surface for supporting the blade from the hub when the rotor is at rest is disposed outwardly from the hub beyond the pivot of the drag joint. Thus the blade is subject to restraint about the drag joint at starting.

The invention thus avoids the defect mentioned above by causing the stop-effect for the flapping movement to be exerted solely upon a part which partakes in the drag movement. Consequently at starting, when there is still no centrifugal force, the blade cannot abruptly remain behind in relation to the drag joint, because it bears with its full weight upon the said part and for this reason has, initially, a frictional damping. When higher speeds of revolution are attained, the blade rises from the stop-means and is thereafter without damping in relation to the drag movement.

Figure 1:
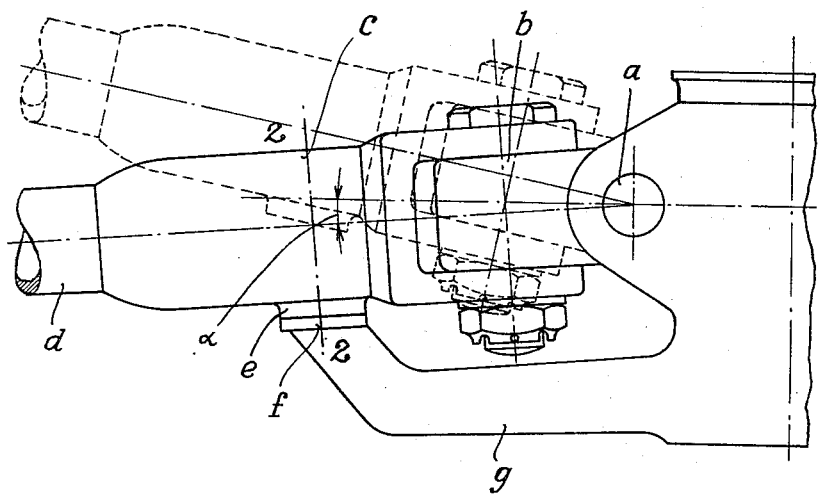

The accompanying drawing illustrates, by way of example, my manner of carrying the invention into effect. In the drawing, Figure 1 illustrates in elevation the means of articulation of one blade to the hub and Figure 2 is a transverse vertical section on line 2—2 of Figure 1.

In relation to the axis of rotation, the flapping joint $a$ is disposed inside the drag joint $b$ to which is connected a sleeve $c$ receiving the spar $d$ of the blade. The sleeve $c$ carries on its underside a plate $e$ which, when the blade is at rest, comes to bear upon a plate $f$. The plate $f$ is mounted upon the rotary hub by means of an arm $g$. In the drawing, the arrangement is shown in full lines in the position of rest in which the plate $e$ bears upon the plate $f$ under the weight of the blade, $\alpha$ being the so-called relax angle. When rotation commences, the blade will rise directly the aero-dynamic forces become equal to the weight of the blade. A raised position of the blade is illustrated by broken lines.

Figure 2:
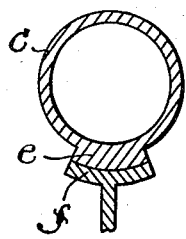

The plate $e$ may be of convex or vaulted shape circumferentially and the plate $f$ of dished or trough shape as illustrated in Figure 2, or vice versa, if it is desired to ensure that the blade, when at rest, shall always assume the same position in relation to the drag movement.

I claim:

1. An aircraft rotor comprising in combination a hub, blades having root mountings flap-jointed and drag-jointed to said hub, brackets extending outwardly from said hub beneath the blade-jointing means and comprising upwardly presented contoured supporting surfaces radially beyond said jointings, and soles on said root mountings presenting complementarily contoured surfaces towards said supporting surfaces and adapted for resting upon the latter when the rotor is at rest for locating the blades in mean radial positions.

2. An aircraft rotor comprising, in combination, a hub, blades having root mountings flap-jointed and drag-jointed to said hub, brackets extending outwardly from said hub beneath the blade jointing means and comprising upwardly presented supporting surfaces radially beyond said jointings for frictionally engaging said blades outwardly beyond said joints, whereby lagging motion of said blades is damped.

HENRICH FOCKE.